United States Patent [19]

Martinez et al.

[11] Patent Number: 4,752,943
[45] Date of Patent: Jun. 21, 1988

[54] FREQUENCY OF OCCURRENCE RETRAINING DECISION CIRCUIT

[75] Inventors: Kenneth Martinez, Pinellas Park; William L. Betts, St. Petersburg, both of Fla.

[73] Assignee: Paradyne Corporation, Largo, Fla.

[21] Appl. No.: 83,654

[22] Filed: Aug. 7, 1987

[51] Int. Cl.$^4$ .............................................. H04L 7/06
[52] U.S. Cl. ......................................... 375/113; 375/8
[58] Field of Search ................... 375/8, 14, 38, 39, 75, 375/78, 106, 108, 113, 119; 371/42, 46, 47

[56] References Cited

U.S. PATENT DOCUMENTS

| | | | |
|---|---|---|---|
| 4,601,044 | 7/1986 | Kromer, III et al. | 375/39 X |
| 4,646,325 | 2/1987 | Zuranski et al. | 375/39 |
| 4,651,320 | 3/1987 | Thapar | 375/39 X |

Primary Examiner—Roy N. Envall, Jr.
Assistant Examiner—Derek S. Jennings
Attorney, Agent, or Firm—Kane, Dalsimer, Sullivan, Kurucz, Levy, Eisele and Richard

[57] ABSTRACT

In a system encompassing the transmission of high speed data over a communication channel, a circuit provides information as to whether the modems of the system are in synchronism. The circuit first determines the number of points being received within a given time at a certain inner location in the signal constellation and at another certain outer location in the signal constellation. The circuit includes an up/down counter which is incremented for each inner point received by the circuit and decremented for each outer point received. The counter output is conveyed to a comparator which determines whether the counter output has reached a preselected threshold. At the time that the counter output reaches the preselected threshold, the comparator outputs a signal which is indicative of the fact that the modems of the system are out of synchronism and retraining of the system is required.

3 Claims, 1 Drawing Sheet

FREQUENCY OF OCCURRENCE RETRAINING DECISION CIRCUIT

This invention relates to U.S. application Ser. No. 07/083,696 filed Aug. 7, 1987 entitled UNOBTUSIVE SIGNATURE FOR MODULATFD SIGNALS, which has the same inventors and assignee as the present application and is being filed simultaneously herewith.

BACKGROUND OF THE INVENTION

1. Field of the Invention

This invention relates to a system for exchanging data over a communication channel and more specifically to modems having an improved means for detecting loss of synchronization.

2. Description of the Prior Art

High speed data communication systems make use of an initial training period in which the modems at each end of the communications channel are synchronized. Prior art systems make a decision to retrain because of loss of synchronization between the modems when the output of an integrator located in a modem receiver indicates that the normalized equalizer error is greater than a preset threshold. However such systems have proven to be unreliable indications of loss of synchronism because such channel impairments as noise spikes can move a received constellation point into an area which is a valid area for another point, and thus no error signal is produced for the point which has been incorrectly shifted. Thus a loss of synchronism condition may not be detected if a substantial proportion of the errors in point placement due to it are not detected because these errors placed the points within a valid area for other points.

OBJECTIVES AND SUMMARY OF THE INVENTION

The principal objective of the present invention is to provide a high speed data communication system with means to reliably detect loss of synchronism between modems at different ends of a channel even if the loss of synchronism causes constellation points to be shifted into areas which are valid for other points on the signal constellation.

Another objective is to provide a system in which all signal constellation points which are shifted due to loss of synchronism are detected and contribute to a decision as to whether to retrain the system to reachieve synchronization between the modems at either end of the channel.

Other objectives and advantages of the invention shall become apparent from the following description of the invention.

The present invention makes use of the knowledge that the shifting of signal constellation points due to a loss of synchronism caused by, for example, attenuation and random noise, results in a heavier concentration of points nearer the origin than if synchronization were still present.

Since the frequency of a current in a synchronized system operating over a relatively unimpaired channel is constant and predictable, the present system monitors the frequency of occurrence of points as the innermost and outermost areas of the signal constellation to determine whether a loss of synchronization has taken place. After the occurrence within a given time of a selected surplus of innermost points over outermost points, a retrain decision to reachieve synchronization is made and implemented.

The means provided within a modem receiver to make the retrain decision include an equalizer, a slicer decoder connected to real and imaginary outputs of the equalizer, an inner and outer point detector which detects an "index" from the slicer decoder, and an up-/down counter which is incremented in an upward direction when inner points are detected, and is decremented when outer points are detected. The counter is negative biased in that a slightly higher value is assigned to the detection of each outer point than is assigned to the detection of each inner point. A comparator matches the output of the counter with a preselected positive threshold, and the comparator produces an output indicating a decision to retrain the system for synchronism when the output from the counter matches the preselected threshold.

DETAILED DESCRIPTION OF THE INVENTION

Figure 1:
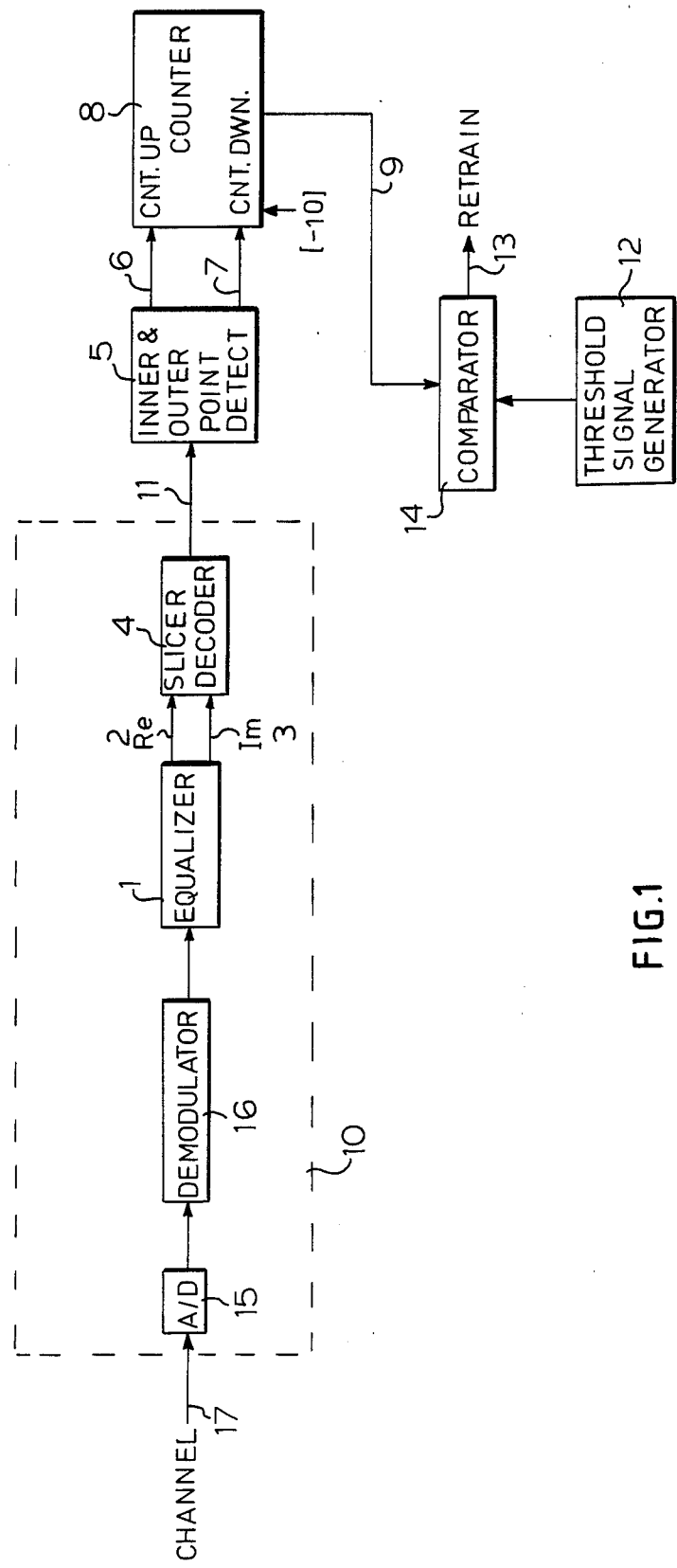
FIG. 1 discloses a schematic of the circuit according to the present invention.

As shown in FIG. 1, a demodulated channel signal, which has passed from communication channel 17 through analog to digital converter 15 and demodulator 16, is conveyed to equalizer one which generates real and imaginary components for transmission to slicer decoder for alarm paths 2 and 3, respectively. The decoder produces an "index" which is transmitted along path 11 to an inner and outer point detector which decides on the basis of its stored information whether an inner or an outer signal constellation point has been received. In the event that an inner point has been received an output is sent along path 6 to the incrementing input of counter 8. If, on the other hand, an outer point is detected a signal is sent along path 7 to the decrementing input of counter 8. It should be noted that the counter is negatively biased in that the decrementing value is higher than the incrementing value (for example, the decrementing value could be −10 while the incrementing value is +9). Counter 8 continuously transmits an output signal along path 9 to comparator 14 which compares the signal from counter 8 with a preselected threshold signal from threshold signal generator 12. When the threshold signal and the counter output signal are equal, comparator 14 outputs the signal which is indicative of the fact that the modems of the system are now out of synchronism and that retraining to achieve synchronism is necessary.

The inventive method shown herein is feasible because channel impairments such as excessive attenuation and random false data transmittals have a relatively high occurrence at inner points on the signal constellation and a relatively low occurrence on outer points of the signal constellation. Also, noise is considered to be generally concentric about the origin of the signal constellation of the complex plane.

Obviously numerous modifications may be made to the invention without departing from the scope as defined in the appended claims.

What is claimed is:

1. A modem receiver circuit for determining whether an out of synchronism condition is occurring between a transmitter modem situated at a remote end of a communication channel and said modem receiver comprising:

means for decoding having inputs of real and imaginary components of a signal received from said channel, said signal having been digitized, demodulated, and equalized, said means for decoding functioning to generate an index output which is indicative of a received point's position in a complex plane used for representing a constellation of received signals;

means for detecting whether said index is representative of a particular point in said constellation, relatively close to said complex plane's origin or whether said index is representative of a particular point relatively far from said complex plane's origin and for outputting a respective signal when either of said particular points is detected;

an up/down counter connected to outputs of said detecting means and functioning to respectively increment or decrement its count when it receives one of said respective signals;

a comparator connected to an output of said comparator and functioning to compare said counter output with a preselected threshold signal so as to generate an output indicative of an out of synchronism condition; and a threshold signal generator for generating send preselected threshold signal and for outputting it to said comparator.

2. The modem receiver circuit of claim 1 further comprising an analog to digital converter connected to said channel, a demodulator connected to an output of said analog to digital converter, and an equalizer connected to an output of said demodulator and having an output connected to said means for decoding.

3. The modem receiver circuit of claim 1 wherein send up/down counter is incremented by a lesser value when said relatively close particular point is detected than it is decremented when said relatively far particular point is detected.

* * * * *